Oct. 14, 1969     I. GINSBURGH ET AL     3,472,285
INJECTION LEAK SEALING APPARATUS AND METHOD
Filed March 24, 1967
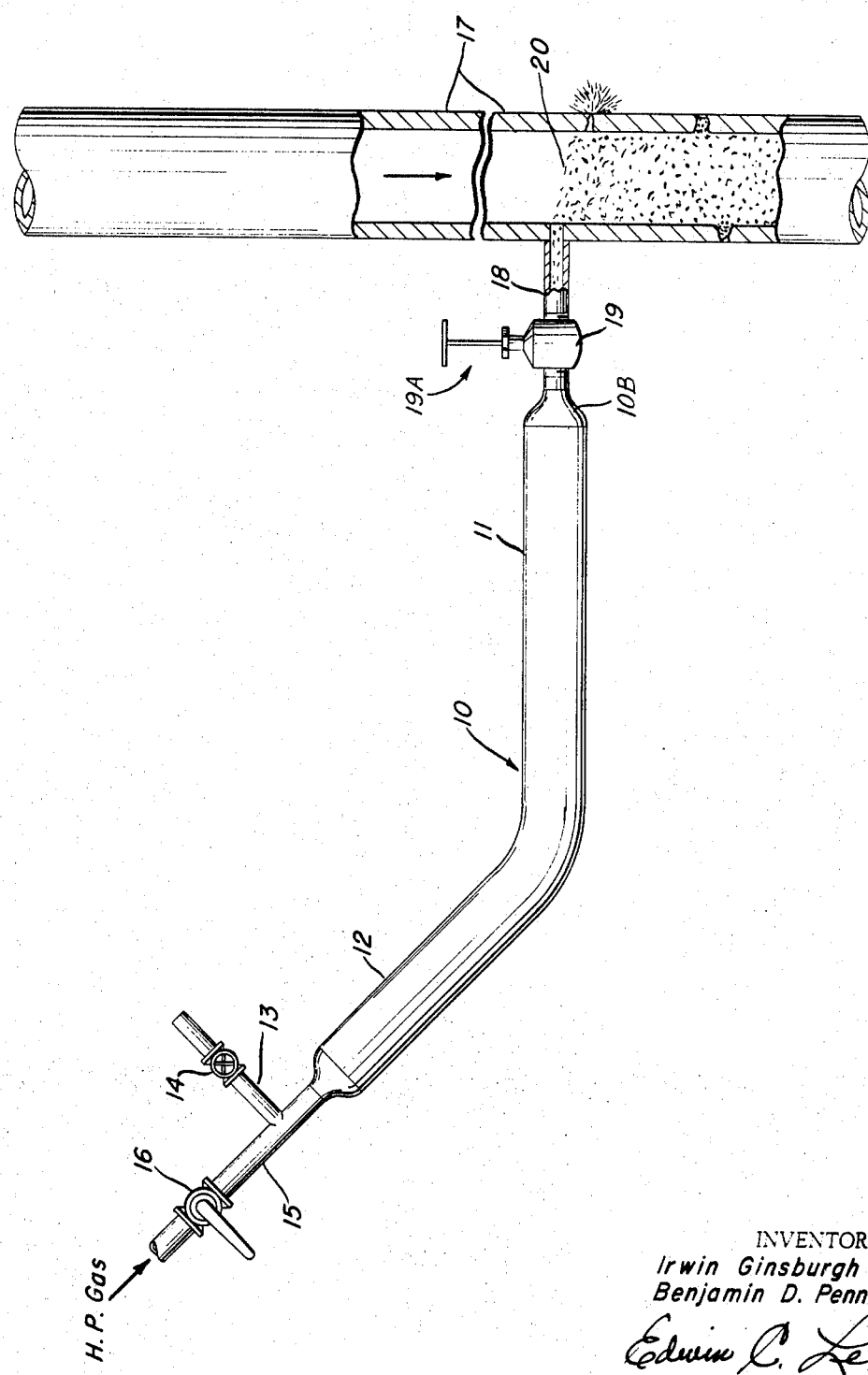
INVENTORS:
Irwin Ginsburgh
Benjamin D. Pennington
ATTORNEY United States Patent Office 3,472,285
Patented Oct. 14, 1969

3,472,285
INJECTION LEAK SEALING APPARATUS AND METHOD
Irwin Ginsburgh, Morton Grove, Ill., and Benjamin D. Pennington, Hammond, Ind., assignors to Standard Oil Company, Chicago, Ill., a corporation of Indiana
Continuation-in-part of application Ser. No. 370,984, May 28, 1964. This application Mar. 24, 1967, Ser. No. 625,684
Int. Cl. F16l 55/18
U.S. Cl. 138—97         5 Claims

ABSTRACT OF THE DISCLOSURE

An injection apparatus and method, the apparatus having a small opening into a leaking line or vessel, the opening connecting through a valve to a tubular supply chamber having a diameter substantially larger than said opening, said chamber having a first portion and a second portion wherein the second portion is oriented at an angle of about 45° from said first portion, the second portion connecting through a pipe and a quick-opening valve, the pipe having a vent means for venting the supply chamber and the quick-opening valve for rapidly introducing fluid under pressure to said chamber containing liquid and leak sealing materials to move the liquid and the leak sealing materials into the leaking line or vessel. The leak sealing materials are sawdust or asbestos fibers, the fibers having a length within the range of about ½–1½ inches.

CROSS REFERENCE TO RELATED APPLICATIONS

This is a continuation-in-part of a pending application, Ser. No. 370,984, filed May 28, 1964, by Ginsburgh and Pennington, now abandoned.

BACKGROUND OF THE INVENTION

This invention relates to injection apparatus and method for sealing leaks in fluid-carrying conduits and vessels. The invention particularly concerns apparatus and method for introducing discrete leak sealing materials to on-stream conduits and vessels upstream from the suspected leak occurring areas.

Losses resulting from undetected leaks in industrial operations such as hydrocarbon refining, chemical processing, water treating, and pipeline transportation and storage operations are of substantial economic importance. The Oil and Gas Journal, Mar. 3, 1939, p. 104, indicated the magnitude of utility leaks. A few illustrations from the data presented in the Journal will demonstrate the significance of leaks. A 2 drop per second leak in an oil line will lose 30 barrels of oil per year. A three-eighths inch opening in an oil line will lose approximately 3,708 barrels of oil per year. A one-half inch opening in a fuel gas line under 20 p.s.i. will lose 5,420,000 cubic feet per month. Steam under 140 p.s.i. will escape through a one-eighth opening at a rate of 68,000 pounds per month.

Leaks are often difficult to detect, particularly if a conduit is buried or insulated. By the time hidden leaks are detected by inventory losses, or become visually detectable, substantial quantities of valuable product may be lost. Even after detection, the cost of locating the leak, removing insulation or digging up a buried conduit to replace or repair a section of the conduit to eliminate leaks is extremely high. Additional economic losses are incurred when the conduit must be blocked off and operations ceased while leaks are being repaired. Therefore, it is desirable to seal leaks in fluid-carrying conduits without uncovering insulated or buried conduits to find and repair the leak, and without ceasing flow through the conduit.

In addition to the economic losses resulting from small leaks, they create a hazard in industries where volatile, explosive, or corrosive fluids are employed. Small undetected leaks may saturate the media surrounding the conduit, causing an acute fire hazard. Similarly, corrosive or deleterious liquids may seep from small leaks in the conduit and result in injury to personnel and destruction of equipment. Leaks in large multi-tube heat exchangers are especially troublesome.

On-stream sealing of leaks in fluid-carrying conduits and vessels is effected by introducing leak sealing materials into the fluid flowing in the conduits, upstream of the known or suspected leak area. The leak sealing materials are then carried downstream in the fluid where they are drawn into and seal the leaks.

Solid discrete materials such as sawdust, asbestos fibers, compressible elastomer plugs of various sizes and shapes are very effective leak sealing materials. Inasmuch as the size and number of leaks is unknown, especially in multi-tube heat exchangers, large volumes of the sealing materials must be introduced. Introduction of small discrete particles of leak sealing materials is normally effected through existing taps such as valved sample lines or other small piping branches on fluid-carrying conduits. The normal tendency of sawdust and asbestos fibers upon contact with a liquid is to clump and agglomerate. Therefore, premature packing of the particles or fibers and plugging of small lines used to introduce such particles to fluid-carrying conduits occurs. Further, there is a need for a single and economical method to introduce a relatively large volume of material through a relatively small orifice without premature plugging.

Typically, the art displays methods and apparatus described in U.S. Patents No. 3,144,049; No. 2,193,499; and No. 2,812,268, to Ginsburgh, Towell, and Bealer, respectively. These references suggest the introduction of elastomeric plugs for low temperature use, apparatus wherein the structural environment is entirely different from the instant novel apparatus, and a method for sealing radiator leaks; however, none of the known art even remotely suggests the method and/or apparatus for introducing large amounts of leak sealing materials into on-stream conduits and vessels operating at high temperatures and pressures, wherein the large amounts of materials are introduced through a constriction or relatively small opening without premature plugging.

An object of the invention is to provide a simple and economical method for introducing discrete particulate leak sealing materials into the fluid in fluid-carrying conduits to seal leaks. Another object of the invention is to provide apparatus that can be used in such method. Additional objects will become obvious to those skilled in the art upon reading the specification.

SUMMARY OF THE INVENTION

It has been discovered that leak sealing materials may be injected through a restricted opening in an on-stream conduit or vessel to effectively seal leaks by apparatus wherein an introduction means including a pipe connecting with the interior of said leaking conduit or vessel is also connected to a valve and a first portion of a tubular supply member having a diameter substantially larger than the introduction means. The first portion of the supply member functions as a supply chamber to hold and retain the large amounts of leak sealing materials. The tubular member has a second portion displaced approximately 45° from said first portion, the second portion of the tubular member terminating in a pendant end connects through a pipe to a quick-opening valve which admits a fluid under high pressure. The second portion retains fluid which forms a fluid column and provides a liquid piston while the first portion serves as a magazine or supply chamber to hold the leak sealing materials.

The leak sealing materials may be sawdust or asbestos. The sawdust is effective to seal leaks in fluid carrying conduits and vessels whose temperatures do not exceed about 550° F. Fibrous asbestos is especially suitable for use in conduits and vessels wherein the temperatures range from about 250° F. to about 1200° F. The quantity and size of the asbestos fibers used as a leak sealing material in accordance with the present invention generally vary depending upon the number and size of the leaks present in the conduits and vessels as well as upon the general nature of the structure and conditions within the systems wherein the leaks occur.

Asbestos fibers ranging in length from about ½–1½ inches are suitable leak sealants for use in the present invention. For example, it has been found that one pound of asbestos fibers ranging in size from about ½–1 inch will effectively seal small to moderate size leaks. Sawdust including small wood chips which will pass through a ½" gate valve opening are effective in sealing leaks in fluid carrying conduits and vessels wherein the temperatures are not in excess of 550° F. Since sawdust per se does not float on water the sawdust can be aerated by placing the sawdust in a chamber to soak in air at a pressure of about 100 p.s.i.g. for about one-half hour to about one hour.

Broadly, the method and apparatus of the present invention for sealing leaks in fluid carrying conduits and on-stream vessels include the use of apparatus which has a favorable geometry to provide a liquid piston such as the column of liquid contained in the second portion of the tubular member so that the liquid piston injects a large volume of sealing material, either sawdust or asbestos contained in the first portion of the tubular member through an introduction means which has a diameter small in comparison to the diameter of the tubular member containing the sealing material and the liquid piston. The ability to rapidly eject the sealing material through the use of the liquid piston or column of fluid produces a localized and randomly dispersed high concentration of sealing material in the fluid flowing in the conduit or vessel so that leaks may effectively be sealed.

BRIEF DESCRIPTION OF THE DRAWING

The introduction of discrete leak sealing material to a fluid, while on-stream, in a fluid-carrying conduit will be described by reference to the accompanying drawing, wherein the figure portrays the injection apparatus in an elevation view, with a substantially vertical on-stream conduit and connecting pipe comprising a part of the introduction means partially in section.

DESCRIPTION OF THE PREFERRED EMBODIMENTS

In the drawing, tubular member 10, which functions as a supply chamber or reservoir for the leak sealing materials, comprises a first portion 11 and a second portion 12. Portion 12 has its longitudinal axis displaced at an angle of from about 45° to about 90° from the longitudinal axis of portion 11. Member 10 is provided at its pendant end with closure means comprising pipe 13 and valve 14 vented to the atmosphere and pipe 15 containing quick-opening valve 16 in communication with a source (not shown) of high pressure fluid. Member 10 is connected to conduit 17 through pipe 18 and valve 19.

In operation, to carry out the introduction of sealing materials 20 to the fluid flowing in conduit 17, a supply of sealing materials is introduced into the first portion 11 of tubular member 10. Member 10 is then connected to the inlet side of valve 19 which is attached to pipe 18 which communicates with the interior of conduit 17. Pipe 18, valve 19, and the end 10B of member 10 comprise the introduction means 19A of the injection apparatus. When member 10 is connected to the inlet side of valve 19, pipe 15 with valve 16 closed can be connected to the pendant end of member 10 and a source of high pressure fluid may be connected to the inlet side of valve 16. Vent line 13 can be opened to the atmosphere by opening valve 14.

Subsequently, valve 19 can be cracked and opened in a manner to permit the fluid in conduit 17 to slowly enter first portion 11 of member 10 so that the fluid from conduit 17 passes slowly through the materials 20 located in first portion 11. The fluid passes through the sealing materials in first portion 11 and rises in second portion 12, pipe 15, and pipe 13 through valve 14. After the system is full valve 14 is closed. With valve 19 fully opened and valve 14 closed, quick-opening valve 16 can be opened to introduce the high pressure fluid through pipe 15 into the second portion 12 of member 10 to rapidly move the liquid column in second portion 12 as a liquid piston against the sealing materials contained in portion 11 of member 10 through introduction means 19A and into conduit 17 in a manner that does not allow the obstruction of the introduction means 19A.

The high pressure fluid used to rapidly eject the column of liquid and sealing material from member 10 should be substantially above the pressure in conduit 17, otherwise there will be insufficient motive force to allow the liquid piston or column of liquid in second portion 12 of member 10 to drive the sealing materials 20 from the first portion 11 of member 10. The unusual ability to rapidly eject the sealing materials 20 from the first portion 11 of the tubular member 10 in the manner described provides localized and randomly disbursed high concentration of sealing materials 20 in the fluid flowing in conduit 17. This ability to provide the localized high concentration of sealing materials by the instant novel injection apparatus and method thus assures a satisfactory supply of individual sealing material for plugging leaks in conduit 17 or other on-stream vessels downstream from the point of injection.

Further illustrative of the practice of the present invention is the injection of sawdust particles or asbestos fibers into a liquid hydrocarbon flowing in a conduit supplying a multi-tube heat exchanger to seal small leaks therein. Approximately one gallon of sawdust or asbestos fibers is deposited in portion 11 of a tubular member having about a 4-inch diameter throughout its length and provided with a removable closure for connection with valve 19. Portions 11 and 12 of member 10 are each approximately 2 feet in length. Member 10 containing the sawdust or asbestos fibers is then attached to the inlet side of valve 19; and to the high pressure gas supply through pipe 15. With valve 16 closed and valve 14 open, valve 19 is opened and the liquid hydrocarbon flowing in conduit 17 thus flows into member 10 forcing the air in the chamber out through vent pipe 13. Valve 14 is closed when liquid appears at the discharge orifice of pipe 13. The column of liquid in member 10 is then rapidly ejected therefrom through valve 19 and line 18 into liquid hydrocarbon flowing in conduit 17 by the burst of high pressure gas introduced through quick-opening valve 16 to member 10. The high pressure gas is preferably at a pressure approximately twice the pressure in conduit 17. The high pressure gas used as the motive force to drive the column of liquid and sawdust or asbestos fibers is preferably an inert gas such as nitrogen. If avoidance of the introduction of gas into a liquid stream flowing in conduit 17 is desired, a free mechanical piston can be included in portion 12 of member 10 and the ejecting gas introduced behind it to drive the liquid and sealing elements from the supply chamber or reservoir 10.

The flow rate of the liquid within the conduit has been found to be related to the effectiveness of the present invention. Experiments have shown that flow rates below about one foot per second tend to cause the asbestos fibers to settle out of the liquid, rather than maintain a random distribution within the liquid. This is undesirable because it inhibits the fibers from becoming lodged in leaks in the upper portion of the conduit. If the flow rate is excessive, upwards of 50 feet per second, the velocity of the liquid tends to drive the fibers past small leaks in the conduit and prevents the fibers from effectively being pulled into the leak. Optimum flow rates for maximum effectiveness of the leak plugging procedure of the present invention have been found to be from about 2.0 to about 20 feet per second. Pressures within the conduit may vary from about 5 p.s.i. to at least about 1,000 p.s.i. without substantially affecting the invention. However, it is preferred that a conduit pressure of at least 20 p.s.i. be maintained during the leak plugging procedure.

The leak plugging technique is not materially affected by the viscosity of the liquid flowing in the conduit. Experiments have shown the procedure to operate effectively in liquids ranging from water to heavy oils.

When sawdust is utilized in the manner within the purview of this invention, that is, the rapid injection of large amounts of sealing materials to provide a localized relatively high density of randomly dispersed particles, depending upon the circumstances problems may exist. For example, during one application of the use of sawdust, the sawdust was injected into one end of a large heat exchanger. The heat exchanger shell was about six feet in diameter and it was suspected that because the sawdust was being injected at the bottom of the inlet none of the sawdust was actually getting into the tubes at the very top, so a method was devised for ensuring that sawdust would float. It was found that if the sawdust was subjected to air at a pressure of about 100 p.s.i.g. for about 30 minutes the sawdust would absorb enough air so that when it was taken from this air-soaking chamber, and then put into a liquid it would float for periods of several hours. To subject the sawdust to air, the sawdust was placed in a chamber which was subsequently sealed, and the air pressure was increased to about 100 p.s.i.g. and the sawdust was allowed to soak in the air for about one-half to one hour.

The following examples follow merely to illustrate and better describe the novel method and apparatus of the instant invention, and no limitation upon the scope of this invention is intended.

EXAMPLE I

Leaking heat exchangers on a fluid cracking unit in a petroleum refinery threatened the entire unit shutdown. The novel apparatus disclosed herein was set up and injections of sawdust were made into the bottom bundles of two banks of condensers of two exchangers. Each two-pass bundle contained 629 tubes and salt water was on the tube side. Injections of two, one and one-half gallons of sawdust in each bank brought the leak down from 30 g.p.m. to 3 g.p.m. Later, after leakage increased to 11 g.p.m., the injections were repeated daily for four days and the leakage was stopped. Injections were made routinely twice a week throughout one summer. This avoided a shutdown of the plant until fall.

EXAMPLE II

A small leak of crude oil into gas oil in a large heat exchanger on a pipe still was causing the gas oil to be off-color specification. A single injection of one gallon of sawdust and wood chips into the 450° F. crude completely stopped the leak within 24 hours. The leak remained plugged for over six months.

EXAMPLE III

Leakage of the tubes of a refrigerant condenser in an alkylation unit permitted water to enter an alkylation acid stream, causing it to become extremely corrosive. The amount of water leaking was determined to be 100 gallons per hour. An injection of sawdust stopped the leak in about twelve hours. Periodically, pressure imbalance in the condenser resulted in dislodging the plugs and the treatment had to be repeated, but the run was extended several months until the next scheduled shutdown. During the shutdown special valves were installed on all exchangers to permit the convenient treatment of any exchanger should leaks occur in the future.

EXAMPLE IV

A temporary overlay patch of an L in a 10″ crude oil transfer line leaked severely on resumption of operations. The temperature of the crude oil was 780° F. A pound of medium length asbestos fibers added in five injections brought the leak under control. A small leak persisted, but it also stopped after five days, presumably due to coking.

Have described the invention, what is claimed is:
1. Apparatus for introducing sealing material into a leaking conduit through which a fluid is flowing, comprising:
   an elongated, tubular member adapted to hold the sealing material, said tubular member being bent so that one portion of the tube has its longitudinal axis displaced relative to the longitudinal axis of another portion of the tube at an angle ranging between about 45° and 95°;
   first means at one end of the tubular member for connecting said member to the conduit, said first means including a passageway leading from the tubular member into the conduit and valve means along said passageway, said passageway having a diameter substantially smaller than the diameter of the tubular member;
   a source of gas which is at a higher pressure than the fluid in the conduit; and
   second means at the other end of the tubular member for connecting said member to said source of gas, said second means including a pair of valves, one of said pair of valves when in the open position introduces said high pressure gas into the tubular member and when in the closed position stops the flow of gas, and the other of said pair of valves when in the open position vents said tubular member to the atmosphere and when in the closed position seals off the tubular member from the atmosphere.

2. A method of introducing particulate sealing material into liquid flowing through a conduit to seal leaks in said conduit, comprising the steps of:
   (a) connecting a member containing the sealing material to the conduit;
   (b) venting said member to the atmosphere and simultaneously placing the conduit and member in communication so that liquid within the conduit flows into the tubular member and wets said sealing material; and
   (c) discontinuing said venting and then applying a high pressure fluid to the member to inject the wetted sealing material into the conduit.

3. The method defined in claim 2 wherein the wetted material first passes through a restricted passageway leading from said member into the conduit so that it is dispersed as it enters the conduit.

4. The method defined in claim 3 wherein the sealing material is aerated sawdust and the high pressure fluid is an inert gas.

5. The method defined in claim 3 wherein the sealing material is asbestos fibers and the high pressure fluid is an inert gas.

References Cited

UNITED STATES PATENTS

| | | | |
|---|---|---|---|
| 1,736,188 | 11/1929 | Daesen et al. | 103—231 |
| 2,193,499 | 3/1940 | Towell. | |
| 2,812,268 | 11/1957 | Bealer. | |
| 3,144,049 | 8/1964 | Ginsburgh. | |
| 3,358,703 | 12/1967 | Ginsburgh | 137—15 |

ROBERT G. NILSON, Primary Examiner

U.S. Cl. X.R.

137—15, 268